(12) United States Patent
Brewer, III

(10) Patent No.: US 8,934,830 B2
(45) Date of Patent: Jan. 13, 2015

(54) GENERIC PERMANENTLY ATTACHED LOOPED PULL ITEM FOR A DOCUMENT HANDLER

(75) Inventor: Charles Raymond Brewer, III, Farmington, NY (US)

(73) Assignee: Xerox Corporation, Norwalk, CT (US)

( * ) Notice: Subject to any disclaimer, the term of this patent is extended or adjusted under 35 U.S.C. 154(b) by 865 days.

(21) Appl. No.: 12/689,293

(22) Filed: Jan. 19, 2010

(65) Prior Publication Data

US 2011/0176847 A1  Jul. 21, 2011

(51) Int. Cl.
*G03G 15/00* (2006.01)
*G03G 21/16* (2006.01)

(52) U.S. Cl.
CPC .......... *G03G 15/605* (2013.01); *G03G 21/1614* (2013.01); *G03G 2221/16* (2013.01); *H04N 2201/0422* (2013.01); *H04N 2201/0444* (2013.01)
USPC .......................................... 399/380; 399/367

(58) Field of Classification Search
CPC ............ G03G 21/1614; G03G 15/605; H04N 1/00551; H04N 1/00519
USPC ................... 399/380, 367, 107, 114
See application file for complete search history.

(56) References Cited

U.S. PATENT DOCUMENTS

| 4,418,804 | A  | * | 12/1983 | Bradley et al. | 190/18 A |
| 7,302,204 | B2 | * | 11/2007 | Katsuyama et al. | 399/107 |
| 2008/0106774 | A1 | * | 5/2008 | Koiwai et al. | 358/498 |

FOREIGN PATENT DOCUMENTS

| JP | 2003110768 | A | * | 4/2003 |
| JP | 2006162743 | A | * | 6/2006 |
| JP | 2007047264 | A | * | 2/2007 |
| JP | 2007065071 | A | * | 3/2007 |
| JP | 2008102435 | A | * | 5/2008 |

* cited by examiner

*Primary Examiner* — Judy Nguyen
*Assistant Examiner* — Jennifer Simmons
(74) *Attorney, Agent, or Firm* — Ronald E. Prass, Jr.; Prass LLP

(57) ABSTRACT

This invention provides a looped item or device attached to a document cover of a xerographic copier so that a wheelchair occupant can pull the document cover down over the platen glass. Better copies are obtained when the cover is down and the automatic document feeder is not accessible until the document cover is down over the platen glass. This invention provides a simple but effective way for a wheelchair occupant to easily use the automatic document feeder even when a previous user of the copier leaves the document cover up away from the platen glass. The loop provided in the looped item (lanyard or handle) is important to this invention.

6 Claims, 7 Drawing Sheets

GENERIC PERMANENTLY ATTACHED LOOPED PULL ITEM FOR A DOCUMENT HANDLER

This invention relates to xerographic marking systems and, more specifically, to the document glass or platen glass cover.

BACKGROUND

A typical electrophotographic or electrostatographic reproduction machine employs a photoconductive member that is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas to record an electrostatic latent image on the photoconductive member corresponding to the informational areas contained within the original document.

After the electrostatic latent image is recorded on the photoconductive member, the latent image is developed by bringing a developer material into contact therewith. Generally, the electrostatic latent image is developed with dry developer material comprising carrier granules having toner particles adhering triboelectrically thereto. However, a liquid developer material may be used as well. The toner particles are attracted to the latent image forming a visible powder image on the photoconductive surface. After the electrostatic latent image is developed with the toner particles, the toner powder image is transferred to a sheet. Thereafter, the toner image is heated to permanently fuse it to the sheet.

To begin the copy or marking process, an original document to be reproduced is placed face down on the platen or document glass and is aligned with the tip of the registration at the top left of the document glass. The document glass cover is then lowered and the marking method begins. If more than one original document is to be reproduced, there generally is an automatic document feeder (ADF) located at the top of the document cover so the document feeder in the cover must be down before the ADF can be used.

In all copying cases, it is essential that the document glass cover be down covering the glass platen. In many cases, the copy machine automatically detects standard document sizes; the cover must be down for this feature to function properly. The cover must be down to avoid viewing of the document lights. These lamps are bright and, while not harmful, they may cause an annoying afterimage. Thus, it is recommended that the document cover always be down or closed. Also, if the document cover is not down, imperfect bordered copies usually result.

Wheelchair-bound operators of xerographic marking systems or Multi-Function Devices (MFDs) who desire to use the document handler when running jobs are sometimes unable to access the document cover when a previous user has left it open. The reach required to grab the document cover from a wheelchair is more than a normal person's arm length.

SUMMARY

The present invention is to permanently attach a mounting plate with a looped pull down device such as a looped handle or lanyard to the front of the document cover. When raised, this would give the wheelchair-bound operator a means to pull the document handler down. A loop in the looped device would further facilitate the operation if the person has limited strength in the hand by allowing the hand to be placed in the loop and simply pulling without needing to grip the device.

The placement of the looped device is important so that it is out of the way of any jam clearance doors or paper path or exposure. It should be placed on the document glass cover at its top corner on a side opposite to a side of the cover abutting other structures such as finishers etc. If the looped device was placed on a cover corner next to a finisher structure, it would be very difficult for the wheelchair occupant or operator to reach the lanyard. If the marking system comprises only a marking module without any abutting structures such as a finisher, the looped device can be placed on either of the top unconnected corners.

DETAILED DISCUSSION OF DRAWINGS AND PREFERRED EMBODIMENTS

Figure 1A:
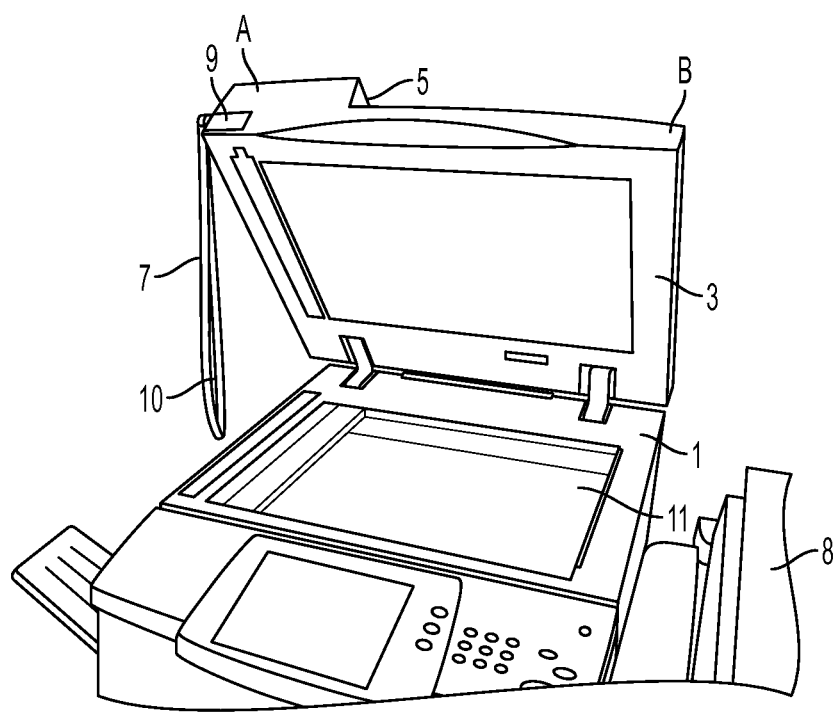
FIG. 1A is a perspective view of the marking apparatus or copier with a looped lanyard located on the raised document cover away from a finisher apparatus.
Figure 1B:
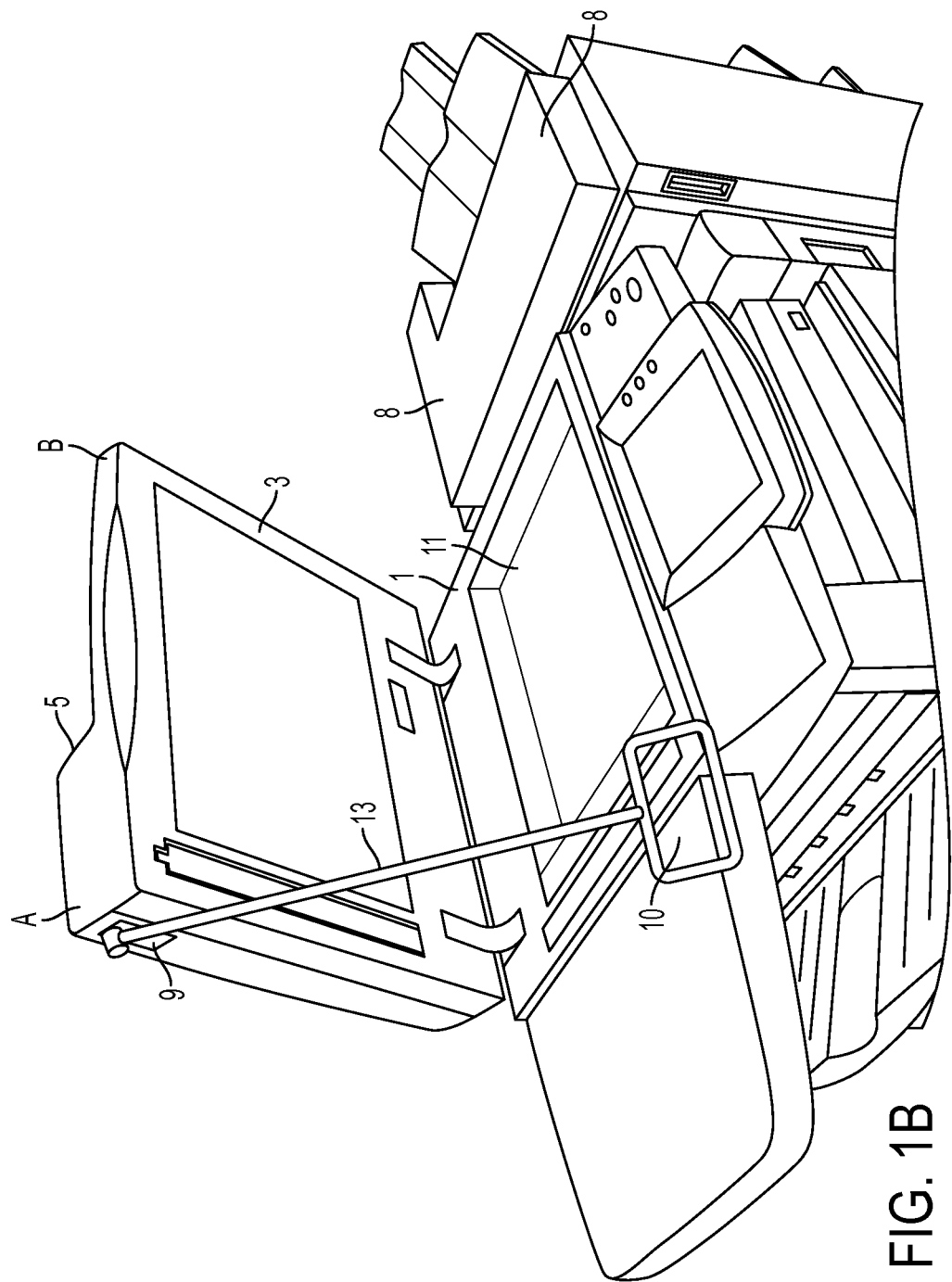
FIG. 1B is a perspective view of the marking system with a looped handle located on the raised document cover away from a finisher apparatus.

In FIGS. 1A and 1B, a xerographic copier or printer module 1 is shown abutting a finisher structure 8. The looped lanyard 7 in FIG. 1A is positioned on the document cover 3 at a corner away from the finisher structure 8 so that it is easily accessible to a wheelchair operator 2. In FIG. 1B a looped handle 13 is used rather than a lanyard 7. The document cover 3 is raised and out of reach of the wheelchair occupant 2 who will need to have the cover 3 down so that he or she can operate the xerographic printer 1. The lanyard 7 or looped handle 13 are permanently attached to a mounting plate 9 at the outside front corner portion A of the document cover 3 away from the finisher 8 or other structures attached to or adjacent the printer 1. In the up position, the automatic document feeder (ADF) 5 is not accessible to the wheelchair operator and the cover 3 needs to be closed or lowered for the wheelchair operator to feed multiple original documents. The lanyard 7 and handle 13 have a loop 10 that facilitates the operator who may have limited strength in the hand by allowing the hand to be placed in the loop 10 and simply pulling down without the need to grip the lanyard 7 or handle 13. Once pulled down, the cover 3 will cover the platen glass 11 and the ADF will be accessible to the user. In all of the figures, the looped lanyard 7 or looped handle can be used interchangeably in all figures.

Figure 2:
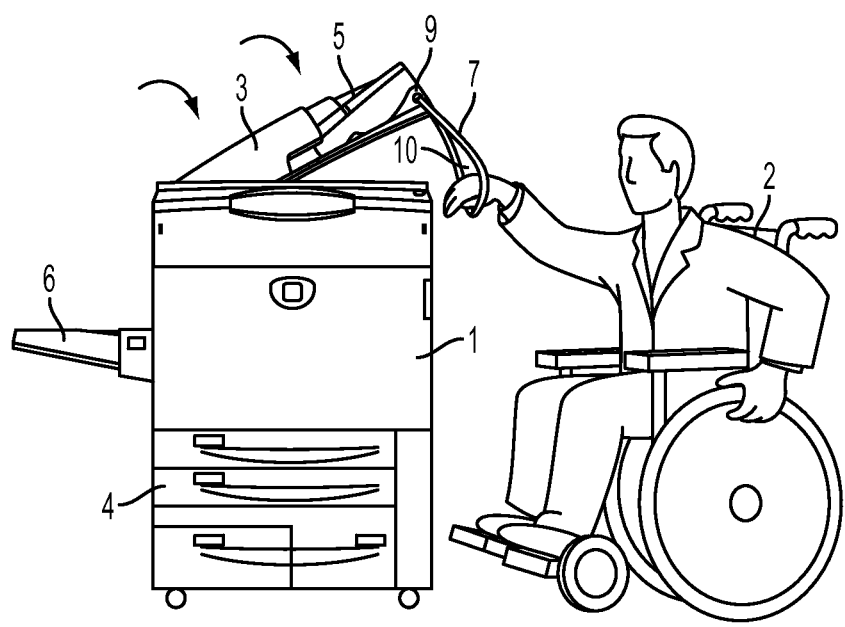
FIG. 2 shows a wheelchair occupant pulling down the document cover by looping his hand through the looped lanyard which can be located on either top corner A or B of the document cover since there are no abutting structures such as a finisher.

In FIG. 2, the wheelchair user 2 is shown pulling the document cover 3 down by the use of the looped lanyard 7; note that the hand is merely placed in the loop 10 if needed. Once the document cover 3 has been pulled down to cover the platen glass 11, the ADF 5 is now accessible to the wheelchair user 2. Also, he or she can now easily move to the paper trays 4 or collection station 6 when needed. The lanyard 7 or handle 13 are permanently attached to a mounting plate 9 that is connected to the cover 3. It is important that a looped device such as a lanyard 7 or handle 13 be used so that a loop 10 is provided for the user.

Figure 3:
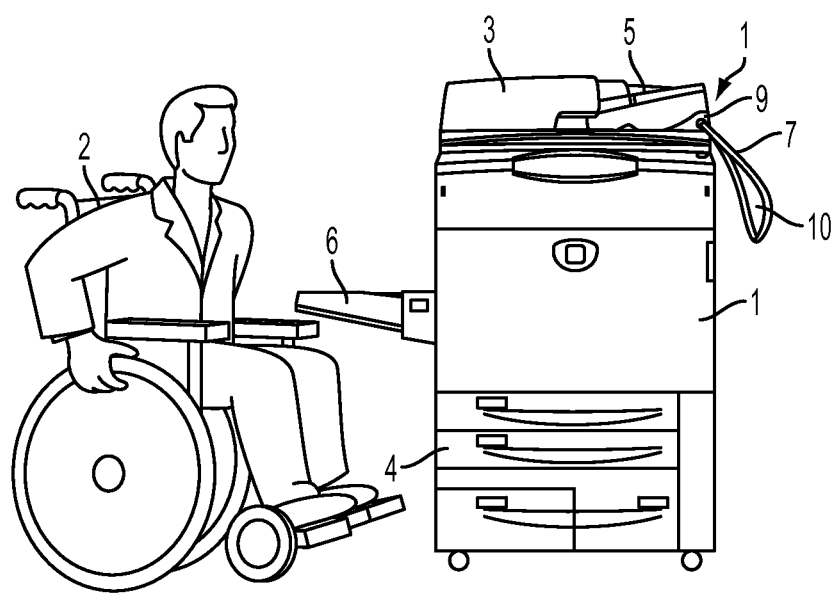
FIG. 3 illustrates the document cover and ADF when they have been pulled down by the wheelchair operator so he can collect the copies from the collection station.

Once the document cover 3 is down as shown in FIG. 3, the operator will move to collection station 6 to remove the copies. Also, the paper trays 4 are easily accessible so that all features, the ADF 5, the paper trays 4 and the collection station 6 are now accessible to the wheelchair user 2.

Figure 4:
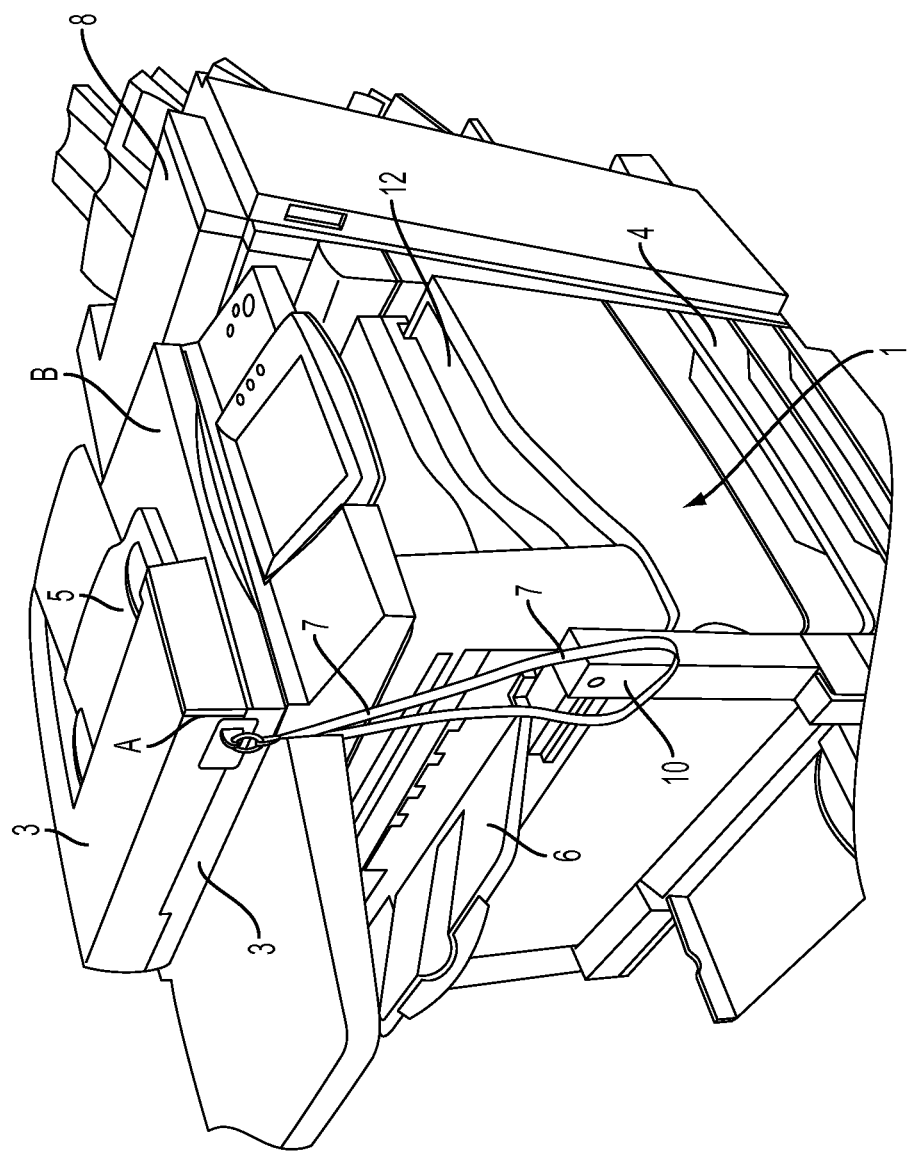
FIG. 4 illustrates the document cover after it has been pulled down so that the automatic document feeder can be used.

FIG. 4 shows the xerographic printer or copier 1 once the document cover 3 has been pulled down so that the ADF 5 is now easily accessible to the wheelchair user. In this FIG. 4, if abutting structures such as a finisher 8 is detached or not adjacent from the copier 1 (as shown in FIGS. 2 and 3), the looped device 7 or 13 can be attached to either or both corners A and B. All other components of the xerographic marking system 1 are now available for use by a wheelchair user 2. The lanyard 7 or looped handle 13 are now located out of the way of any jam clearance doors 12 or paper path.

Figure 5:
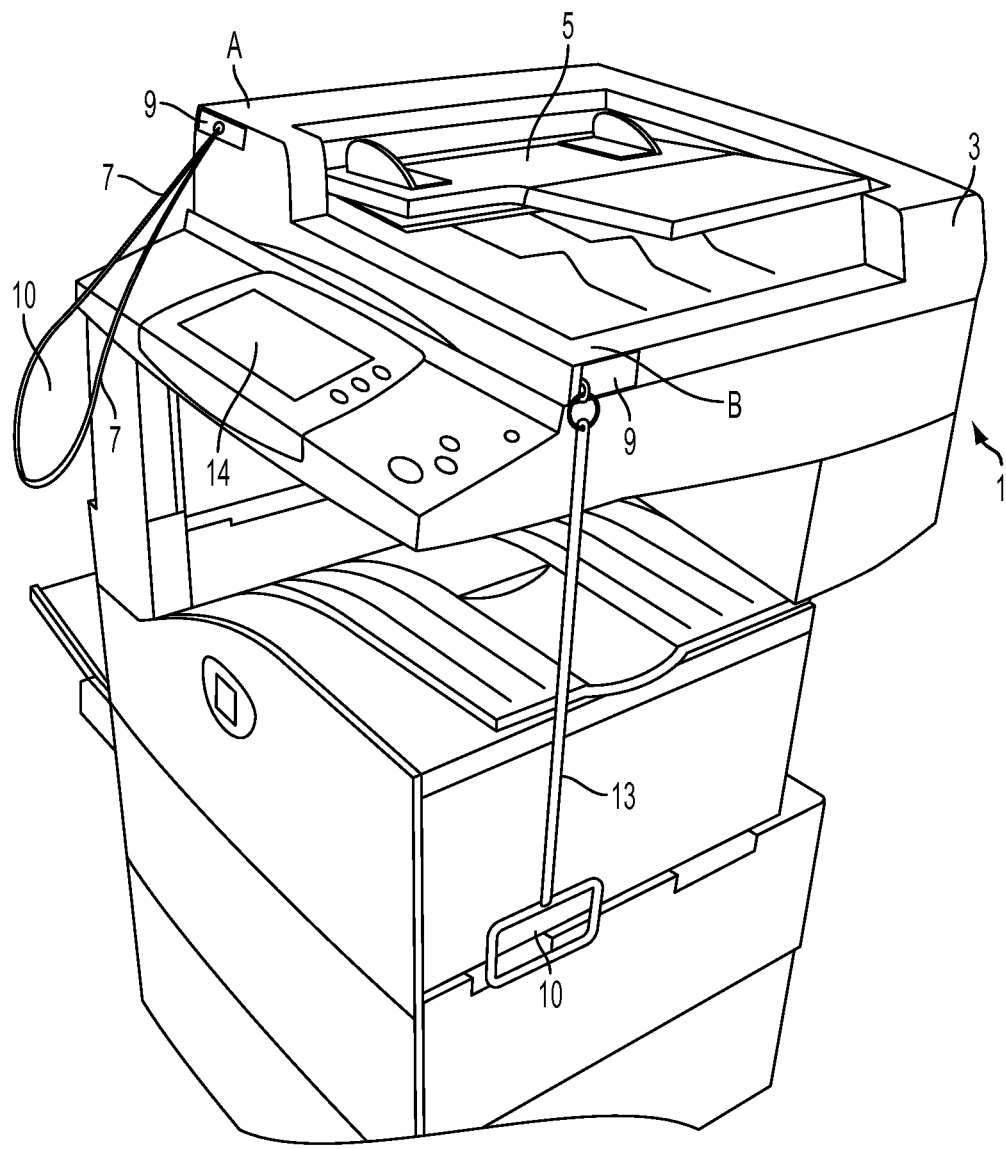
FIG. 5 illustrates the xerographic printer module with the document cover pulled down and a looped handle on one top corner and a looped lanyard on a second top corner of the document cover.
Figure 6:
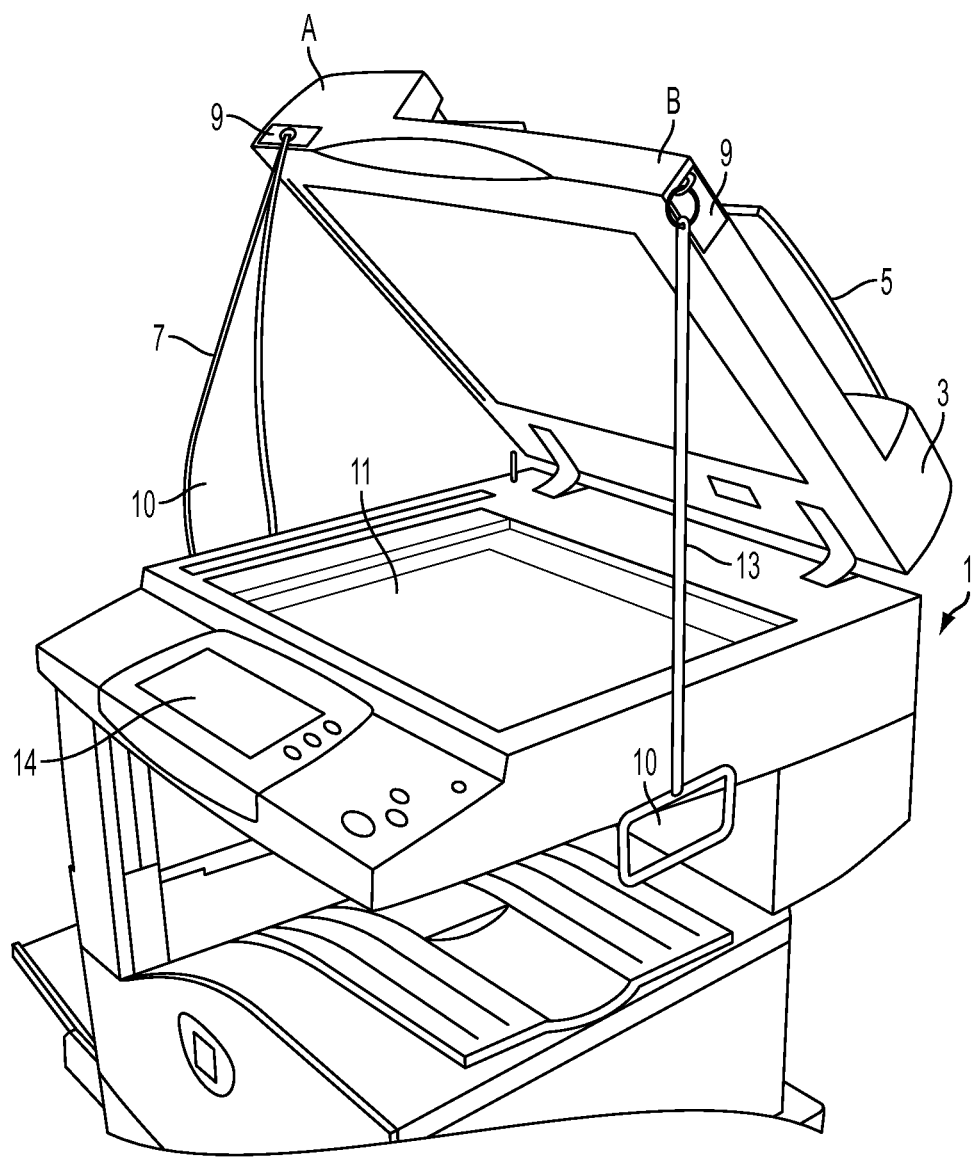
In FIG. 6 a xerographic copier or printer is shown with the document cover in the up position having a looped handle on one corner and a looped lanyard on a second top corner of the document cover.

In FIGS. 5 and 6 a stand alone copier 1 (not connected to a finisher or other structure) is shown having in FIG. 5 the document cover 3 down covering the platen glass 11, and in FIG. 6 the document cover 3 is up exposing the platen glass 11. In both FIGS. 5 and 6, a looped lanyard 7 is attached to corner A and a looped handle 13 is attached to corner B. The loop 10 is extremely important to this invention since many handicapped people 2 in a wheelchair may not be able to grip an item, but are fully capable of putting their hand through a loop 10 and pulling down. The looped lanyard 7 and the looped handle 13 provide this feature. In some instances, it is desirable to have a looped pull down item either or both the lanyard 7 and handle 13; these items 7 and 13 can be the same on both corners A and B or can be different as illustrated in FIGS. 5 and 6. Note that in all cases the looped items 7 and 13 are always clear of the other functions such as the control panel 14 in the marking system 1.

In summary, this invention provides a xerographic marking system comprising a marking or printing module having a platen glass located on a top portion of the module and a hinged document cover movably attached to the module at a position over the platen glass. The document cover is configured to be moved above or atop the platen glass; the document cover has on its top outside portion an automatic document feeder. The document cover has attached to at least one top unhinged corner at least one looped device. This looped device is configured to be pulled downwardly to a downward position to thereby cover the platen with the document cover. In one embodiment the marking module has at least one abutting structure such as a finisher, the looped device in this embodiment is placed on a corner of the document cover farthest away from said abutting structure. When the marking module has no abutting structures, such as a finisher, the looped device can be attached to either or both top unhinged corners of the document cover.

As shown in the figures, the looped device is a looped lanyard or a looped handle. They can be used interchangeably or one can be placed on one corner (A) and the other on corner (B). The document cover when pulled down provides the wheelchair occupant access to the automatic document feeder. The looped device is easily accessible to a wheelchair occupant and is configured to permit the occupant to pull the document cover over said platen so that the automatic document feeder is accessible. The looped device is attached to the document cover by a mounting plate which is permanently fixed to at least one unhinged corner of the document cover. The looped device is configured to not obstruct other functions of the module when the document cover is in the closed or downward position. The looped device is configured to permit a user to place his or her hand into the loop and simply pull down on the looped item or device without needing to grip the looped device with the user's fingers.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A xerographic marking system comprising:
   a marking module having a platen glass located on a top portion of the marking module;
   a hinged document cover having an automatic document feeder on a top portion of the document cover, the document cover being movably attached to the marking module and configured to cover the platen glass when the document cover is in a closed position;
   a first mounting position comprising a first plate permanently fixed to an unhinged portion of the document cover;
   a second mounting position comprising a second plate being permanently fixed to another unhinged portion of the document cover; and
   a handle comprising a looped portion and a free-hanging rigid portion, the handle being attached to a first one of the first mounting position and the second mounting position via a ring configured to link with a loop that is attached to at least one of the first plate and the second plate, the ring being configured to cause the rigid portion of the handle to hang freely,
   the handle being configured to be pulled to cause the document cover to move from an open position to the closed position; and
   a looped lanyard attached to a second one of the first mounting position and the second mounting position, the looped lanyard being configured to hang freely from the respective mounting position and to be pulled to cause the document cover to move from the open position to the closed position.

2. The system of claim 1, the marking module having at least one abutting structure, the handle being positioned on a portion of the document cover that is distal from the abutting structure.

3. The system of claim 1, the causing the document cover to be moved to the closed position providing access to the automatic document feeder.

4. The system of claim 1, the handle being accessible to a wheelchair occupant, the configuration of the handle permitting the wheelchair occupant to move the document cover between the open position and the closed position.

5. The system of claim 1, the handle being configured to not obstruct other functions of the marking module.

6. The system of claim 1, the handle being configured to permit a user to place a hand into the looped portion of the handle and to pull down on the handle without needing to grip the handle with the user's fingers.

* * * * *